United States Patent
Mueller et al.

(10) Patent No.: US 6,786,109 B2
(45) Date of Patent: Sep. 7, 2004

(54) SAFETY DEVICE FOR SUPPORTING PEDALS

(75) Inventors: Martin Mueller, Friolzheim (DE); Dieter Papenhagen, Winnenden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/852,285

(22) Filed: May 10, 2001

(65) Prior Publication Data

US 2002/0007693 A1 Jan. 24, 2002

(30) Foreign Application Priority Data

May 10, 2000 (DE) .......................................... 100 22 813

(51) Int. Cl.$^7$ ................................................. G05G 1/14
(52) U.S. Cl. .............................. 74/512; 74/513; 74/560
(58) Field of Search .......................... 74/512, 513, 560

(56) References Cited

U.S. PATENT DOCUMENTS

| | | | | |
|---|---|---|---|---|
| 3,388,610 A | * | 6/1968 | Pyle et al. ..................... | 74/512 |
| 3,803,941 A | * | 4/1974 | Yoshikawa .................... | 74/489 |
| 3,977,732 A | * | 8/1976 | Grosseau ................ | 188/106 F |
| 4,875,385 A | * | 10/1989 | Sitrin .......................... | 74/512 |
| 5,460,061 A | * | 10/1995 | Redding et al. .............. | 74/512 |
| 5,896,781 A | | 4/1999 | Muller ....................... | 180/274 |
| 6,289,766 B1 | * | 9/2001 | Sukeshita et al. ............. | 74/512 |
| 6,402,262 B1 | * | 6/2002 | Ersoy et al. ............. | 303/114.3 |

FOREIGN PATENT DOCUMENTS

| | | |
|---|---|---|
| DE | 4409235 A1 | 10/1994 |
| DE | 4409324 A1 | 10/1994 |
| DE | 19501859 A1 | 7/1996 |
| DE | 19501859 A1 | 7/1996 |
| DE | 19501680 C2 | 1/1997 |
| DE | 19718384 A1 | 11/1997 |
| DE | 19631212 C1 | 12/1997 |
| DE | 19617372 C1 | 1/1998 |
| DE | 19652014 A1 | 6/1998 |
| DE | 197 33 512 A1 | 2/1999 |
| DE | 19737114 A1 | 5/1999 |
| EP | 788931 A2 | 8/1997 |
| EP | 0788931 A2 | 8/1997 |
| EP | 827874 A2 | 3/1998 |
| GB | 2 353 009 | 2/2001 |
| JP | 9-123948 | 5/1997 |
| JP | 9-216528 | 8/1997 |
| JP | 10-109626 | 4/1998 |
| JP | 10-512518 | 12/1998 |
| WO | WO 96/22903 | 8/1996 |
| WO | WO 97/28029 | 8/1997 |

OTHER PUBLICATIONS

European Search Report dated Nov. 4, 2003.

* cited by examiner

Primary Examiner—David A. Bucci
Assistant Examiner—Julie K. Smith
(74) Attorney, Agent, or Firm—Crowell & Moring LLP

(57) ABSTRACT

A safety device is here described for supporting pedals in motor vehicles, especially passenger cars, with a bracket support arranged in the area of a wall area of a splash wall or bulkhead that is noticeably deformed into a passenger compartment in the event of a vehicle head-on collision, in which bracket support a pedal pivot shaft of at least one swivelling pedal, especially a brake pedal, acting on a push rod is mounted. At the same time the pedal pivot shaft is mounted in the bracket support in a guide extending at least basically horizontally, the guide has limits in each horizontal direction. In addition the pedal pivot shaft in normal operation is fixed in a forward position of the guide, viewed in the forward direction of travel, and the fixing is neutralized in the event of a head-on collision.

16 Claims, 5 Drawing Sheets

SAFETY DEVICE FOR SUPPORTING PEDALS

BACKGROUND AND SUMMARY OF THE INVENTION

This application claims the priority of German application 100 22 813.5, filed May 10, 2000, the disclosure of which is expressly incorporated by reference herein.

The present invention relates to a safety device for supporting pedals in motor vehicles with a bracket support arranged in a wall area of a splash wall or bulkhead that is noticeably deformed into a passenger compartment in the event of a vehicle head-on collision, a pedal pivot shaft of at least one swivelling pedal, acting on a push rod being mounted in the bracket support.

In a head-on collision of a vehicle, especially a passenger car, most vehicles sustain among other things major deformations and displacements of the so-called splash wall or bulkhead, which divides the passenger compartment from the engine compartment, into the passenger compartment.

The pedals for operating the vehicle, that is the foot controls, are often fixed to the wall area of this very same splash wall or bulkhead, which in the event of a head-on collision of the vehicle is noticeably deformed into the passenger compartment.

Left to themselves, therefore, the foot controls with the pedals coupled thereto would, in the event of a head-on collision of the vehicle, also be shifted further into the passenger compartment, thereby considerably increasing the risk of injury to the driver.

In addition, it is also conceivable, however, that a deformation of the vehicle might occur in such a way that the driver's foot becomes trapped under a pedal, thereby causing undue harm to the occupant of the driver's seat.

In order to avoid such harm, especially foot injuries, to the occupant, DE 4 409 235 A1, for example, discloses a method of fitting the pedal pivot shaft to the fixed vehicle mounting in an abutment, which through interaction with an unlocking mechanism supported on a cross member fixed to the vehicle, automatically releases the pedal pivot shaft in the event of a frontal impact. The disadvantage of this pedal support, however, is that it is relatively expensive to manufacture and takes up a lot of space in the motor vehicle, thereby greatly increasing the manufacturing costs and also the operating costs of the motor vehicle.

In addition, German Patent document DE 4 409 324, for example, discloses a design for safety foot controls in such a way that the pedals of the foot controls are swivel-mounted on a pedal pivot shaft, which is in turn fitted at the bottom of a slot-shaped sliding-block guide of the bracket support that extends at least approximately vertically and, in the event of a displacement of the bracket support towards the cross member due to a collision, is automatically drawn upwards in the sliding-block guide by a cable or a chain-shaped force-transmitting member acting thereon and interacting with deflection sheaves. As a result the pedal(s) is/are shifted upwards out of the vehicle footwell into areas of the passenger compartment presenting no danger to the driver. The pedal and the push rod are automatically uncoupled. This, too, is a very expensive design arrangement, which leads to unacceptably high manufacturing costs.

German Patent document DE 196 17 372 furthermore discloses a method of uncoupling the brake pedal from its support by pyrotechnic means in the event of a head-on collision. In such a development it has proved necessary, among other things, to provide expensive sensors, which in the event of a head-on collision activate a pyrotechnic gas generator, thereby uncoupling the pedal from its suspension.

European Patent application EP 0 827 874 also discloses an arrangement, in which the pedal pivot shaft can be released from its support, hence releasing the pedal pivot shaft from the pedal bracket support in the event of a head-on collision.

In the case of the accelerator pedal unit described in German Patent document DE 196 31 212 and corresponding U.S. Pat. No. 5,896,781, the pedals are released in the event of a vehicle accident by breaking of the bolts fixing the pedals to the bracket support. It is thereby possible to reduce the risk to the driver from the fixed pedal shifting into the passenger compartment in the event of a head-on collision.

Similarly in German Patent document DE 195 01 680 PS foot controls are explained, in which the pedal support shaft is fully released in the event of a head-on collision. The pedal then remains connected only to the brake or clutch cable or the like and can otherwise move freely in relation to the surrounding footwell, so that in the event of an accident it can move out of the way of the feet and/or legs of the driver.

In the case of these foot controls disclosed by the prior art, in which the pedals detach themselves completely from the pedal support shaft in the event of a head-on collision, the fact that the pedal, after release from its support, can move about uncontrollably in the vehicle footwell may, however, be disadvantageous.

German Patent document DE 195 01 859 A1 in addition discloses a safety arrangement for a motor vehicle with pedal foot controls, in which a bracket support for the pedal foot controls is fixed to a carrier element, which is separated and isolated from a splash wall defining the front of the passenger compartment. The carrier element is therefore intended to be located in a position in the vehicle, which is not directly affected by a vehicle accident and does not therefore immediately push the pedal foot controls further into the passenger compartment in the event of a frontal impact. In the event of an accident the pedal foot controls can even be displaced by the driver by means of an actuating rod, thereby reducing the risk of injury to the driver.

The pedal foot controls with the actuating rod described in this published patent application are in no way safe in the event of a vehicle accident, however, and cannot effectively prevent injuries to the driver, since the entire arrangement is exposed to the deformations occurring in the event of an accident and as a result the proposed operating action cannot be guaranteed. Furthermore, the separated arrangement of the bracket support requires a relatively large design space.

German Patent documents DE 196 52 014 and DE 197 37 114 also disclose a pedal support for a motor vehicle, which is to be provided in such a way that the pedal can be uncoupled from its support in the event of a frontal impact.

The method specified in PCT publication WO 97/28029, which describes how the pedal support shaft is uncoupled from its support by means of release devices also functions in a similar way. The release devices are activated by sensors.

In all the safety devices known in the prior art for the support of pedals in vehicles, the fact that following a head-on collision the pedal is sometimes partially uncoupled from the push rod but is in all cases completely uncoupled from its support so that, for example, braking with the corresponding brake pedal is no longer possible, has, however, proved disadvantageous.

It is the object of the present invention, therefore, to provide a safety device for the support of pedals in motor vehicles, in which partial braking at least is still possible following a head-on collision.

This object is achieved by a safety device of the type stated in the introductory part having the pedal pivot shaft is mounted in the bracket support in a guide extending approximately horizontally, the guide having limits in each horizontal direction; and the pedal pivot shaft in normal operation being fixed in a forward position of the guide, viewed in a forward direction of travel, and the fixing being neutralized in the event of a head-on collision.

The safety device according to the invention for supporting pedals in motor vehicles includes a bracket support arranged in the area of a wall area of a splash wall or bulkhead that is noticeably deformed into a passenger compartment in the event of a vehicle head-on collision. A pedal pivot shaft of at least one swivelling pedal, especially a brake pedal, acting on a push rod is mounted in the bracket support. The pedal pivot shaft is mounted in the bracket support in a guide extending basically horizontally, the guide having limits in each horizontal direction and the pedal pivot shaft in normal operation being fixed in a forward position of the guide, viewed in the forward direction of travel, and the said fixing being neutralized in the event of a head-on collision.

Such an arrangement indicates that the pedal is no longer fixedly supported in the event of a head-on collision, but is allowed a certain facility to move towards the interior of the vehicle. It is, however, not separated in such a way that the connection to a push rod is completely lost or that the pedal is only still fixed to the latter, leaving it dangling loosely about this fixing. It is thereby possible, even after release of the fixing, to undertake at least partial braking through the support in the guide and the fixing to the brake rod.

Another advantage of such a safety device is the fact that the pedal, released from its fixed support, does not dangle uncontrollably in the footwell but moves in a controlled manner in the footwell.

In this context a head-on collision, as mentioned, is intended to include any type of collision in which deformations might occur in the frontal area of the vehicle. This indicates that it may also involve secondary head-on collisions, for example, and need not necessarily relate to primary head-on collisions.

It also goes without saying that the partial braking, which according to the present invention is retained even following an accident, cannot be retained in accidents of absolutely any severity. If a very heavy head-on collision occurs, the support for the pedals according to the present invention may also be destroyed in such a way that braking is no longer possible. In an accident of such severity, however, braking will also no longer be required.

It has proved particularly advantageous if the safety device according to the invention is designed in such a way that the fixing is neutralized by movement of the support bracket relative to a part of the vehicle that retains its spatial position basically unchanged even in the event of a head-on collision.

In such a development of the present invention it is of particular advantage that no separate release mechanism need be provided for the fixing, but that the fixing is simply neutralized by relative movement in the event of a frontal impact.

Further advantages and advantageous developments of the invention are set out in the claims and the example of an embodiment, the principle of which is described with reference to the drawing.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
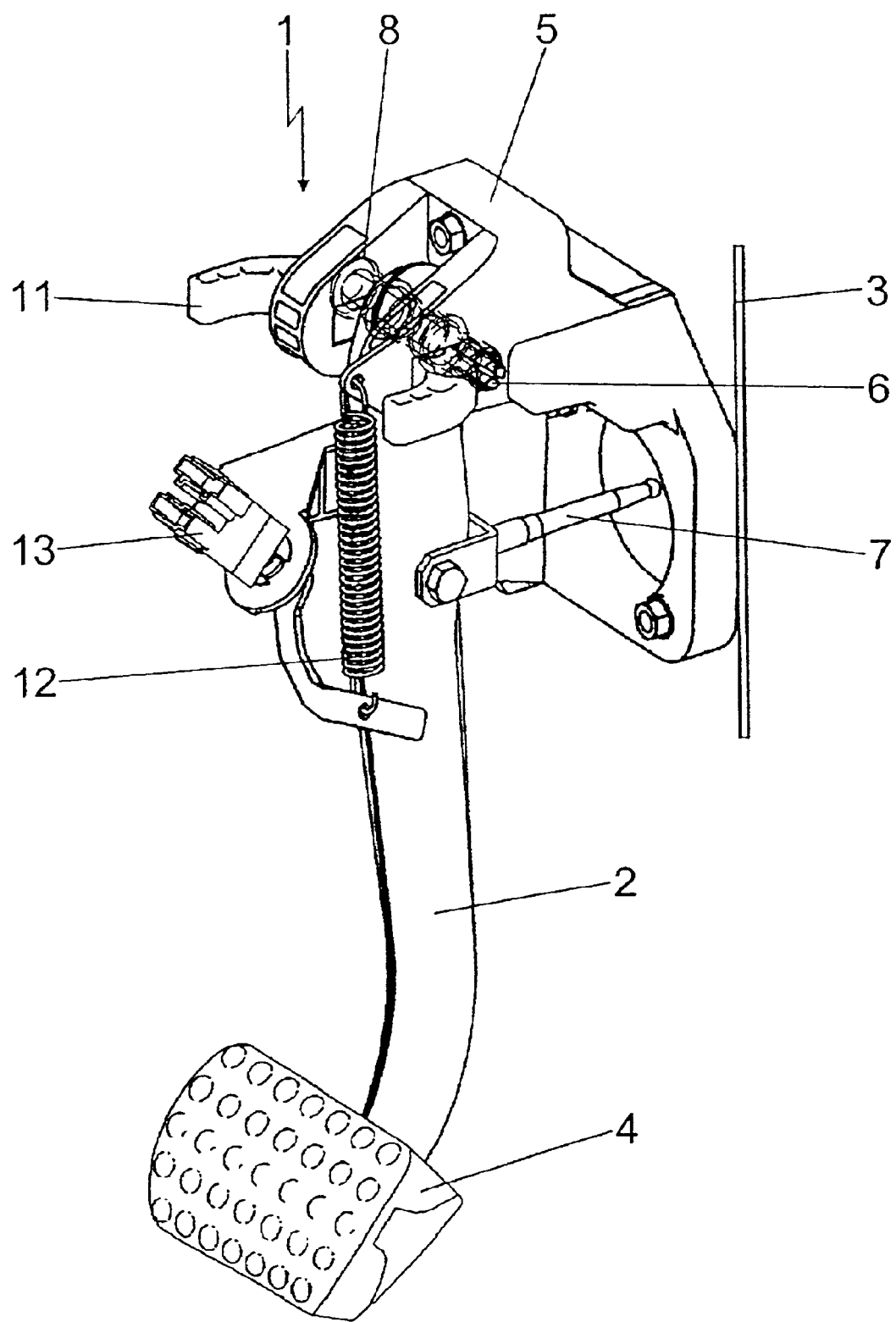
FIG. 1 shows a three-dimensional view of a safety device according to the invention in its normal position.

Referring to FIG. 1, a safety device 1 is shown in its normal position, that is without a head-on collision having occurred. Such a safety device serves for the support of pedals 2 in motor vehicles, with a bracket support 5, which is arranged in a wall area of a splash wall or bulkhead 3, that is clearly deformed into a passenger compartment in the event of a head-on collision of the vehicle. A pedal pivot shaft 6 of at least one swivelling pedal 2 acting on a push rod 7, especially a brake pedal with a pedal plate 4, is mounted in the bracket support 5.

Figure 2:
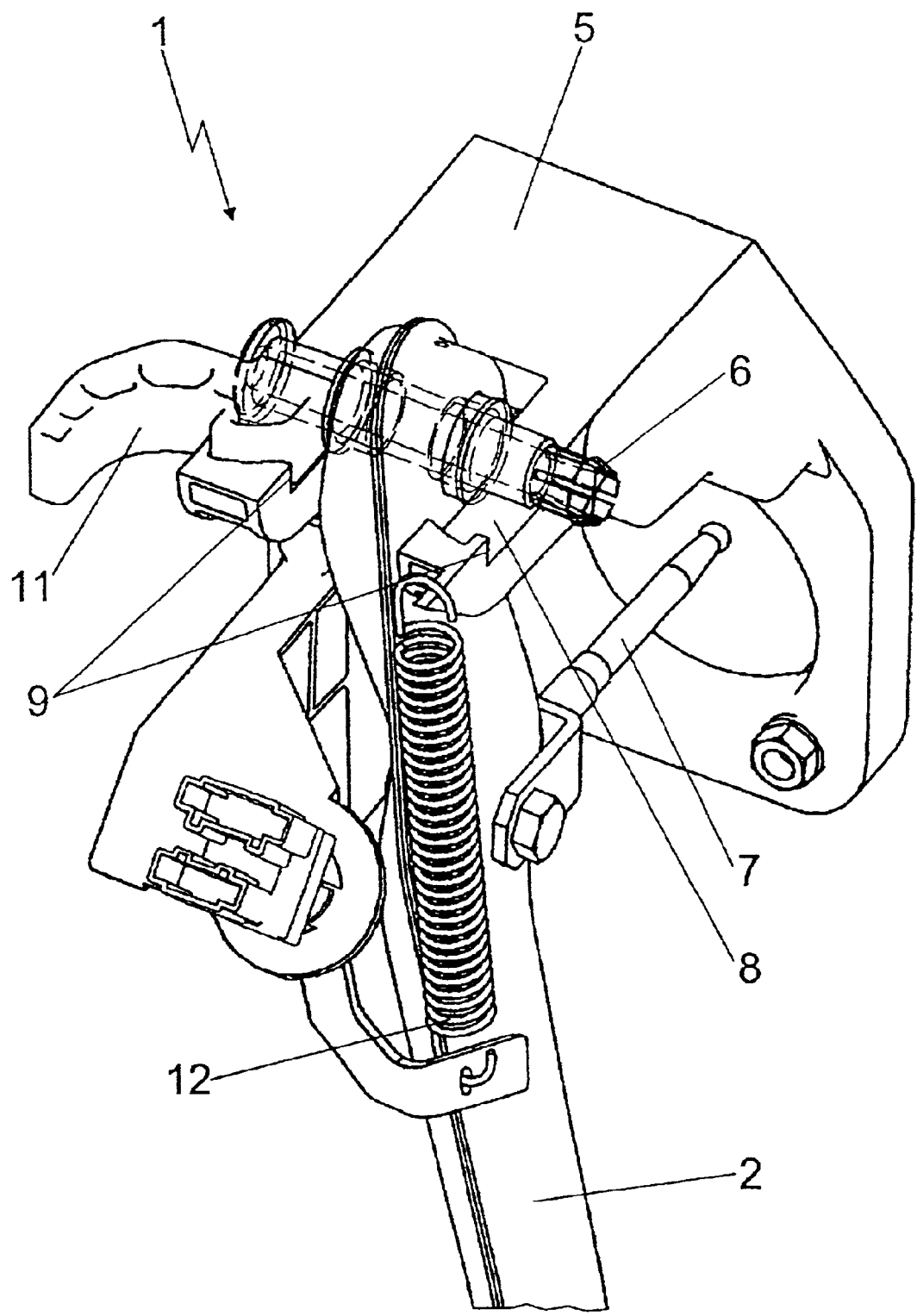
FIG. 2 shows an enlarged section of the area of the support for the pedal pivot shaft in FIG. 1 in a partially cutaway view.

It can be seen from FIG. 2, which shows an enlarged section of the area of the support for the pedal pivot shaft 6 in FIG. 1, and in which the bracket support is cut away in the area of the support for the pedal pivot shaft, that the pedal pivot shaft 6 is mounted in the bracket support 5 in a guide 8 extending at least basically horizontally. The said guide 8 has limits 9 in each horizontal direction. In the normal position shown in FIG. 2 the pedal pivot shaft 6, as in FIG. 1, is in normal operation fixed in a forward position of the guide 8, viewed in the forward direction of travel.

FIG. 1 and FIG. 2 also show a return spring 12, which serves, when the brake is released, that is once the weight of the driver's foot is withdrawn from the pedal 2, to return the pedal 2 into its normal position, thereby no-longer exerting any pressure on the push rod 7. If the brake is operated, the brake light is activated by way of the brake light switch 13.

Figure 3:
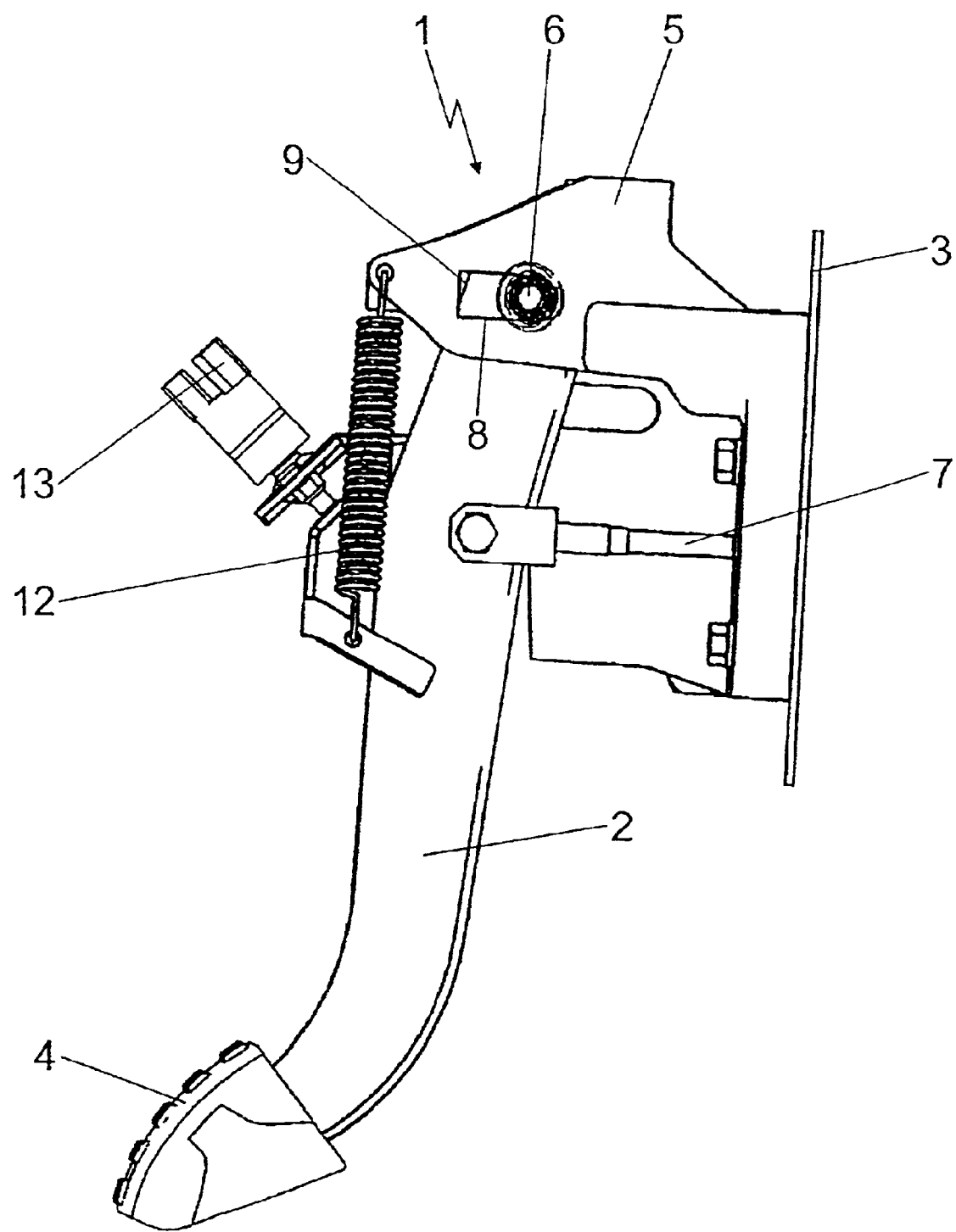
FIG. 3 shows a side view of the safety device according to the invention in its normal position.

FIG. 3 shows a side view of an arrangement of the safety device in its normal position, according to FIG. 1 and FIG. 2. The position of the pedal pivot shaft 6, in particular, can clearly be seen from this. In order to show the position of the pedal pivot shaft 6 clearly, the fixing 11 has been omitted from this representation.

In this case, the fixing 11, according to a preferred embodiment of the invention, can be neutralized by movement of the bracket support 5 relative to a part of the vehicle that retains its spatial position basically unchanged even in the event of a head-on collision. That is to say that the fixing is fixed to such a vehicle part basically retaining its position in the event of a head-on collision and is neutralized due to the fact that the bracket support 5 moves and the fixed part does not.

Figure 4:
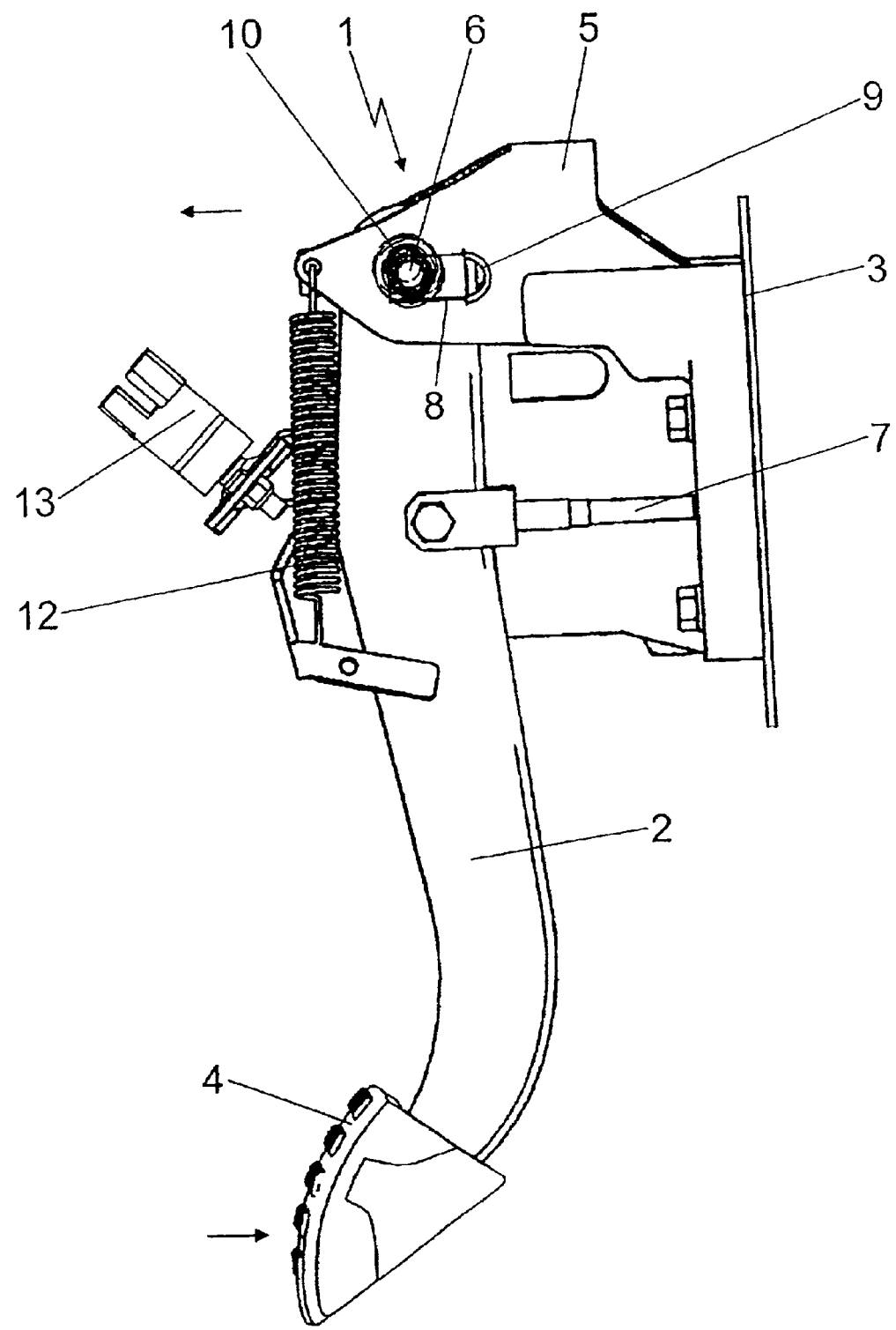
FIG. 4 shows a representation according to FIG. 3, the pedal being shown in a position following release of the safety device according to the invention.

FIG. 4 contains a representation according to FIG. 3, but shows the position of the pedal 2 after the fixing 11 has been neutralized.

The fixing 11 not represented in FIG. 3 and FIG. 4 is neutralized in the event of a head-on collision, thereby allowing the pedal pivot shaft 6 to run rearwards in the guide in the bracket support 8, viewed in the forward direction of travel. At the same time the pedal 2 swivels forwards. The attachment of the pedal 2 to the push rod 7, about which the pedal 2 can be swivelled, is then to be regarded as the fixed point. The pedal 2 can in this case run forwards without any force being applied. The movement of the pedal 2 after neutralizing of the fixing 11 following a head-on collision is represented by the arrows in FIG. 4.

The pedal 2 is now no longer fixed to the safety device 1 shown and cannot therefore lead to entanglement and trapping of the vehicle occupant's foot.

Nor can the pedal 2 easily run uncontrollably into the passenger compartment, thereby injuring the occupant of the vehicle.

The forward travel available to the pedal 2 can also be modified by adjusting the length of the guide 8 in the bracket support 5, and thus adjusted to the prevailing circumstances of the respective vehicle.

According to a preferred embodiment of the present invention, the part of the vehicle that retains its spatial position basically unchanged even in the event of a head-on collision is a vehicle part fixed to the body.

The said vehicle part fixed to the body may be a cross member, for example, or also a dashboard cross member 20, as shown in FIG. 2. Both vehicle parts are vehicle parts arranged behind the pedal 2, viewed in the forward direction of travel, these parts in the event of a head-on collision usually being basically fixed to the vehicle or at least only being adversely affected in the event of very serious accidents.

As can be seen from FIG. 1 and FIG. 2, the guide 8 in the bracket support 5, at least in its horizontal extent, basically presents a rectangular shape. It might equally also be designed as an elongated hole, however.

By varying the length of the guide 8, such as the length of the elongated hole or the rectangle, it is possible, as already described, to modify the forward pedal travel available in the event of a head-on collision, thereby adapting it to the prevailing circumstances of the respective vehicle.

Designing the guide 8 in the form of an elongated hole has proved advantageous, since this can be created very easily and can also very easily be restored to a form corresponding to the prior art, should a safety device 1 according to the present invention no longer be desired, since in that case it can easily be reduced in size, for example, by filling it up, restoring it to the shape of a conventional hole.

According to a preferred embodiment of the invention, the rearward movement of the pedal pivot shaft 6 in the guide 8 of the bracket support 5, viewed in the forward direction of travel, can also be assisted by an additional spring, so that the pedal 2 also actually moves rearwards as soon as the fixing 11 is neutralized. Such an embodiment has proved advantageous especially where other units of the vehicle monitor the correct release of the safety device 1 according to the invention and can detect this only when the pedal 2 has also actually moved rearwards in the guide 8 in the bracket support 5, viewed in the forward direction of travel.

It should be emphasized, however, that a spring is not absolutely essential for a safety device 1 according to the invention, since the pedal 2 can always be moved after release of the fixing 11, and trapping of a vehicle occupant's foot is therefore no longer possible. The preferred embodiment, which has a spring, is only intended to be used, for example, in the case of a measurement of the pedal position, in order that measurements can then be made correctly.

As can also now be seen from FIG. 1 and FIG. 2, a safety device 1 according to the invention has a fixing 11 of the pedal pivot shaft 6, in such a way that release levers are provided on that part of the vehicle which basically retains its position in the event of a head-on collision as the fixing 11. Thus, the release levers may have a stop on the body, for example.

If, in the event of a head-on collision, the pedal bracket support 5 now moves towards the vehicle interior due to deformation of the splash wall or bulkhead 3, the fixing 11 of the pedal pivot shaft 6 designed as a release lever can be released in that the vehicle part that retains its spatial position basically unchanged even in the event of a head-on collision moves in relation to the pedal bracket support 5. As a result the fixing 11, preferably represented by release levers, is released. The release levers articulated on a part fixed to the vehicle may, for example, simply be folded away by the relative movement described.

According to a further preferred embodiment of the present invention, the fixing 11 may also be release assisted by an auxiliary force. At the same time provision might likewise be made for a sensor to measure a frontal impact and to then release the fixing 11 by hydraulic, pneumatic or pyrotechnic devices.

As detailed in FIG. 3 and FIG. 4 the brake rod 7 remains connected to the brake pedal 2 in the normal position and in the release position. Even in the release position of the fixing 11, the connection at the brake rod 7 to the pedal 2 represents a form of pivot, about which the pedal 2 can swing in the event of release. Trapping of a vehicle occupant's foot is therefore prevented.

The fact that the brake rod 7 is not released from the pedal 2 and that the pedal pivot shaft 6 also still has at least some support, although not a fixed-point bearing, shwos that it is still possible to exert a force on the brake rod 7. Although this might not always be fully feasible, at least the facility for partial braking is still retained.

If a vehicle were now involved in a head-on collision, the safety device 1 according to the present invention would be activated. Following this head-on collision it is conceivable that the vehicle might be flung on to the opposite carriageway and find itself in an area of the carriageway in which the traffic was still flowing, or might threaten to end up there or on pedestrian walkways. In such a case it may be very important that the vehicle, despite the release of the safety device 1 preventing the driver's foot from becoming trapped, can still be braked, and braked before it rolls further on to the opposite carriageway, for example. A second collision may thereby possibly be prevented.

The safety device 1 according to the invention can therefore improve the safety not only of the occupants of the vehicle but also of other road users.

The safety device 1 according to the present invention has also proved particularly advantageous because its very simple design affords a high degree of safety for the vehicle occupants and others involved in an accident.

According to the present invention the safety device 1 may be designed in such a way that the pedal bracket support 5 is conventionally made of plastic as in the case of existing pedal foot controls of the prior art. This shows that the innovative lightweight construction of the pedal bracket support 5 hitherto used can also be used in a safety device 1 according to the invention, so that in addition to a simple design no unnecessary increases in the weight of the vehicle and hence in running costs are incurred as a result of the safety device 1.

Moreover, the pedal 2 and in particular the brake pedal, may be designed as a double-shell pedal in a known way. This shows that the conventional pedal 2 already in use, that is a pedal 2 formed from two deep-drawn steel half-shells can also continue to be used in an arrangement according to the present invention. The advantages of this pedal 2 that has proved torsionally very stiff are thereby also retained in an arrangement according to the invention.

Figure 5:
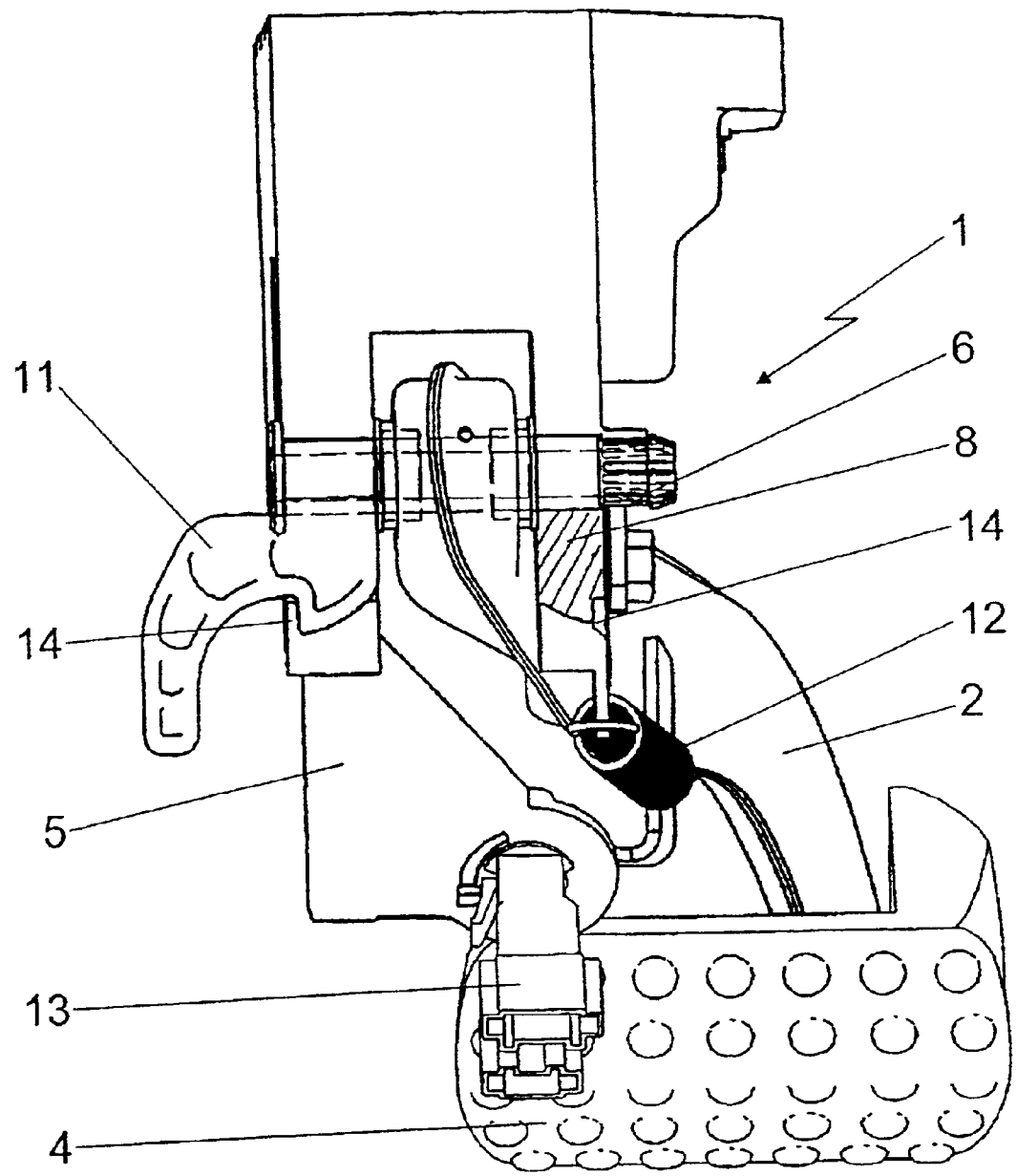
FIG. 5 shows a top view of a representation of the safety device according to FIG. 3, a release lever being represented on one side but not on the other side.

FIG. 5 shows a further top view of a representation of the safety device 1 according to FIG. 2, a release lever as the fixing 11, which closes the elongated hole 8, being shown on one side. The other side is shown without a release lever and only with the pedal support shaft 6 in the elongated hole 8. As can be seen from the representation in FIG. 5, the release lever as the fixing 11 is arranged in its position closing the elongated hole 8, so that it is arranged in front of the pedal support shaft 6, viewed in the direction of the passenger compartment. If the lever is now released due to deformation of the engine compartment bulkhead 3, the lever will be withdrawn and the wall area 14 thereby broken off. The release force of the fixing 11 can therefore be modified by way of the strength of the wall area 14.

The foregoing disclosure has been set forth merely to illustrate the invention and is not intended to be limiting. Since modification of the disclosed embodiments incorporating the spirit and substance of the invention may occur to persons skilled in the art, the invention should be construed to include everything within the scope of the appended claims and equivalents thereof.

What is claimed is:

1. A safety device for the support of a pedal in a motor vehicle, with a bracket support arranged in a wall area of a splash wall or bulkhead that is noticeably deformed into a passenger compartment in the event of a vehicle head-on collision; a pedal pivot shaft of at least one swivelling pedal acting on a push rod being mounted in the bracket support, wherein the pedal pivot shaft is mounted in the bracket support in a guide extending approximately horizontally, the guide having limits in each horizontal direction; and the pedal pivot shaft in normal operation being fixed in a forward position of the guide directly by a fixing, viewed in a forward direction of travel, and the fixing being neutralized and thereby releasing the pedal pivot shaft to move from the forward position in the event of a head-on collision.

2. The safety device according to claim 1, wherein the fixing is neutralized by a movement of the bracket support relative to a part of the vehicle that retains a spatial position approximately unchanged even in the event of the head-on collision.

3. The safety device according to claim 2, wherein the vehicle part retaining the spatial position unchanged in the event of the head-on collision is fixed to a body of the vehicle.

4. The safety device according to claim 3, wherein the vehicle part fixed to the body is a cross member.

5. The safety device according to claim 3, wherein the vehicle part fixed to the body is a dashboard cross member.

6. The safety device according to claim 1, wherein the guide in the bracket support, extending at least approximately horizontally, has an approximate shape of an elongated hole.

7. The safety device according to claim 1, wherein a rearward movement of the pedal pivot shaft in the guide, viewed in the forward direction of travel, in the event of the head-on collision is assisted by a spring.

8. The safety device according to claim 1, wherein the fixing of the pedal pivot shaft is achieved by release levers fixed to the part of the vehicle that approximately retains an unchanged position in the event of a head-on collision.

9. The safety device according to claim 8, wherein the fixing is released by movement of the pedal bracket support relative to the part of the vehicle that approximately retains the unchanged position in the event of the head-on collision.

10. The safety device according to claim 1, wherein the fixing is released assisted by an auxiliary force.

11. The safety device according to claim 1, wherein the pedal bracket support is formed from plastic.

12. The safety device according to claim 1, wherein the pedal is designed as a double-shell pedal.

13. A pedal assembly with a safety device in a motor vehicle, comprising:
    a bracket support being arranged in a wall area of a splash wall or bulkhead which is deformed into a passenger compartment in the event of a vehicle head-on collision,
    a pedal pivot shaft of at least one swivelling pedal which acts on a push rod, said shaft being mounted in the bracket support, and
    a guide extending approximately horizontally in the bracket support with limits in each horizontal direction, said shaft, in normal operation, being fixed in the guide directly by a fixing device,
    wherein, in the event of the head-on collision, the fixing device releases the shaft in the guide and thereby the shaft is movable in the guide.

14. A pedal assembly according to claim 13, wherein the pedal is a brake pedal.

15. A pedal assembly according to claim 13, wherein the fixing device is connected to a relatively stationary part of the vehicle during the vehicle collision, and a relative movement between the part and the bracket support in the event of the collision releases the shaft in the guide.

16. A method of making a safety device for the support of a pedal in a motor vehicle, comprising:
    arranging a bracket support in a wall area of a splashwall or bulkhead that is deformed into a passenger compartment in the event of a vehicle head-on collision, and
    mounting, in the bracket support, a pedal pivot shaft of at least one swivelling pedal acting on a push rod,
    wherein the pedal pivot shaft is mounted in the bracket support in a guide extending approximately horizontally, the guide having limits in each horizontal direction, and the pedal pivot shaft, in normal operation, is fixed in the guide at a forward position in a direction of travel directly by a fixing, the fixing being neutralized and thereby releasing the pedal pivot shaft to move from the forward position in the event of the head-on collision.

* * * * *